March 19, 1968 — L. H. BRIXNER — 3,374,444

VACANCY COMPENSATED CALCIUM NEODYMIUM VANADATE PHOSPHORS

Filed Oct. 21, 1964

INVENTOR
LOTHAR H. BRIXNER

BY Fred C. Carlson
ATTORNEY

United States Patent Office 3,374,444
Patented Mar. 19, 1968

3,374,444
VACANCY COMPENSATED CALCIUM NEODYMIUM VANADATE PHOSPHORS
Lothar H. Brixner, Brandywine Hills, Pa., assignor to E. I. du Pont de Nemours and Company, Wilmington, Del., a corporation of Delaware
Filed Oct. 21, 1964, Ser. No. 405,521
6 Claims. (Cl. 331—94.5)

ABSTRACT OF THE DISCLOSURE

Luminescent compositions, useful as laser components, are crystalline, single-phase solid solutions of neodymium-substituted, vacancy-compensated calcium vanadates of the formula $Ca_{3-3x}Nd_{2x}\Phi_x(VO_4)_2$ where $\Phi$ represents the vacancy in the crystal lattice and $x$ has a value of 0.01 to 0.3.

---

Figure 1:
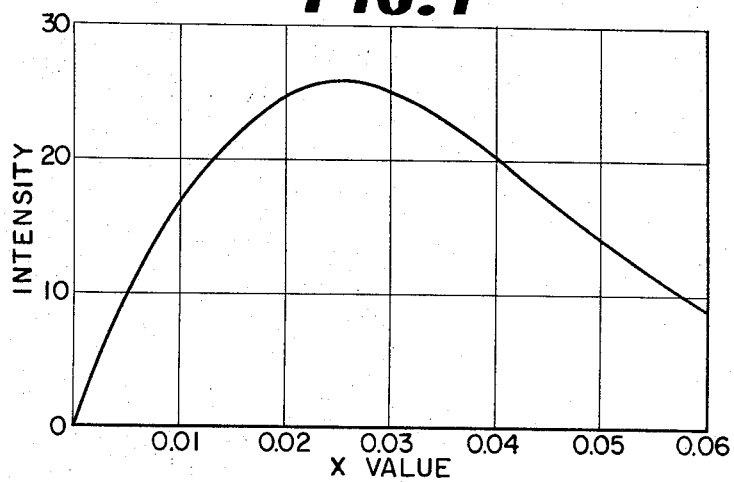

This invention relates to new luminescent materials, to luminescent single crystals suitable for laser applications, and to processes for producing such materials and single crystals. More particularly, the invention is directed to novel luminescent compositions of matter which are crystalline, single-phase solid solutions comprising calcium rare earth vanadates having vacancies in their crystal lattices, the component elements in the compositions and their proportions relative to said vacancies being in accordance with the expression $$Ca_{3-3x}Ln_{2x}\Phi_x(VO_4)_2$$

where Ln is a rare earth element of atomic number 58 through 71, $\Phi$ is the vacancy, and $x$ has a value between 0.01 and 0.3; is further directed to solid state lasers having as an essential crystal component thereof a single crystal of a said single phase solid solution; is still further directed to processes for producing said solid solutions comprising the steps of (1) thoroughly mixing stoichiometric quantities of (a) $Ca_3(VO_4)_2$, (b) $Ln_2O_3$ where Ln is as above stated, and (c) $V_2O_5$ according to the expression $$1-xCa_3(VO_4)_2 + xLn_2O_3 + xV_2O_5$$

where $x$ has a value between 0.01 and 0.3, (2) firing the mixture at a temperature of from 600 to 800° C., (3) regrinding, and (4) refiring at a temperature of from 1000 to 1300° C.; and is also directed to said processes in which the product is obtained in the form of a single crystal by preparing the mixture of step (1) in the form of a melt, inserting in said melt a single crystal seed of the selected composition, and growing the single crystal at the rate of ¼ to 1 inch per hour by withdrawing it upward from the melt. In preferred specific embodiments, the rare earth element is neodymium and $x$ has a value of 0.04.

Figure 2:
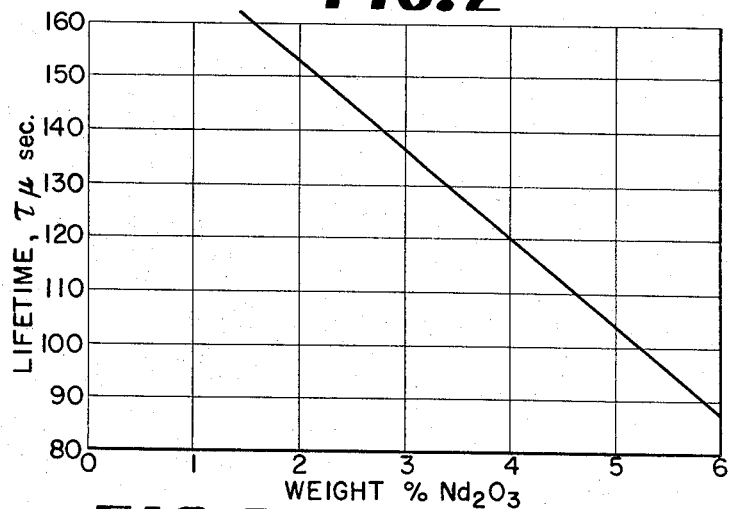
Figure 3:
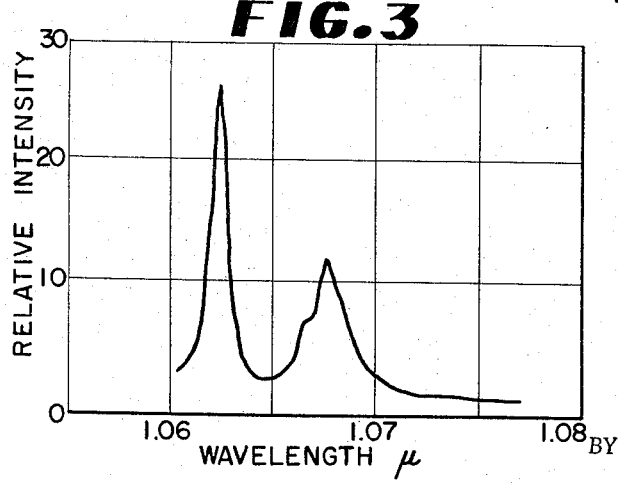

In the drawings:

FIGURE 1 shows the fluorescent emission spectrum for compositions of the formula $Ca_{3-3x}Nd_{2x}\Phi_x(VO_4)_2$ in which the intensity of fluorescence in arbitrary units is plotted against the values of $x$ from 0 to 0.06, and FIGURE 2 shows a graph of the fluorescent lifetime, (in microseconds) of certain compositions of this invention plotted as a function of $Nd^{+3}$ concentration, and FIGURE 3 shows the fluorescent emission spectrum for a composition of formula $Ca_{2.94}Nd_{0.04}\Phi_{0.02}(VO_4)_2$, where arbitrary intensity units are plotted against the spectrum range in micron units.

From FIGURE 3 it will be seen that the intensity of fluorescence is very strong over a short range of the spectrum, characterizing this composition as a "line emitter." Those luminescent compositions which may be classed as line emitters are characterized by a very narrow half-width of lines. By "half-width" is meant the line width at half the intensity peak. Because of this characteristic, the compositions of this invention are indicated to be useful as laser crystals. The term "laser" is a well-known acronym for "light amplification by stimulated emission of radiation."

Although calcium vanadate is a well-known compound, it has hitherto not been used as a host crystal for the preparation of materials having emission spectra of sufficiently narrow half-widths to permit their use as laser materials. The compositions of this invention are believed to be the first laser crystals based on a calcium vanadate host.

In describing this invention the symbol Ln is used to represent generically the rare earth elements of atomic numbers 58 through 71 and the symbol $\Phi$ is used to represent a vacancy in the vanadate crystal lattice, both in accordance with accepted usage. In the novel crystalline compounds, in order to preserve electroneutrality in the basic formula $Ca_3(VO_4)_2$, $2x$ trivalent rare earth ions $Ln^{+3}$ are replacing $3x$ bivalent $Ca^{+2}$ ions, leaving $x$ vacancies, as indicated by $\Phi$ in the formula above stated. It will be understood that Ln stands for at least one of such rare earth elements; if more than one is present the $2x$ factor applies to the total of said elements, rather than to each individually.

The solid solutions herein described can be prepared by heating together the stoichimetric quantities of the component calcium vanadate and rare earth vanadate-forming materials. While in the specific examples which are given below calcium vanadate, the rare earth (neodymium) oxide, and vanadium pentoxide were the materials used for the preparation of these crystals, it will be understood that the rare earth oxide can be pre-reacted to form the corresponding rare earth vanadate and this vanadate then reacted with the calcium vanadate, as an equivalent practice.

In general, the solid solutions of this invention have been prepared by thoroughly mixing the required quantities of the component materials, sintering these materials at a temperature below the melting point of any of the component materials, regrinding to insure homogeneity in the sintered material, and refiring within temperature schedules which effect the formation of single-phase solid solution products. Where single crystals of the compounds were prepared, the procedure used was to form the single crystals from a melt of calcium vanadate which contained the rare earth oxide and vanadium pentoxide in the desired stoichiometric quantities by means of the Czochralski technique, well known to those skilled in the art. That the products were, indeed, novel, single phase, solid solution crystals was demonstrated by analyzing all of them by X-ray diffraction and finding them to give none of the lines of the constituent components.

The following examples will more specifically describe the method of preparation and the results of testing of the compositions of this invention.

Example 1

For the preparation of crystals of the composition $Ca_{2.9625}Nd_{0.0250}\Phi_{0.0125}(VO_4)_2$, stoichiometric quantities of $Ca_2(VO_4)_2$, $Nd_2O_3$, and $V_2O_5$ were carefully weighed out in proportions calculated from the following equation:

$$2.9625Ca_3(VO_4)_2 + .0125Nd_2O_3 + .0125V_2O_5 \rightarrow$$
$$3Ca_{2.9625}Nd_{0.025}\Phi_{0.0125}(VO_4)_2$$

The amounts of reactants were 96.0000 grams $Ca_3(VO_4)_2$ 1.1679 grams $Nd_2O_3$; and 0.6314 gram $V_2O_5$. These materials were mechanically mixed by ball milling in an agate mortar under acetone. The mixed powders were dried, and the mixture fired in air at a temperature below the melting point of $V_2O_5$, that is, below 690° C. The firings continued for 14 hours at 650° C. The thus sintered crystalline material was cooled, broken up, and homogenized by ball milling again in the agate mortar under acetone. The powder mixture was dried and subjected to a second firing step in which it was heated in air for 14 hours at 1150° C. The temperature was then increased to 1350° C. for final two hours of heating.

The product of this firing was a white crystalline powder. This powder was analyzed as to crystal structure by X-ray diffraction and was found to crystallize in the $C^6_{2h}$ space group, with lattice parameters and $a_0 = 8.45$ A., $b_0 = 10.76$ A., $c_0 = 6.99$ A., $\beta = 95.0°$.

*Examples 2 to 4*

Using the procedure of Example 1, compositions of the following formulas were prepared, using the indicated amounts of materials:

| Ex. No. | | $Ca_3(VO_4)_2$ | $Nd_2O_3$ | $V_2O_5$ | K |
|---|---|---|---|---|---|
| 2 | $Ca_{2.925}Nd_{0.050}\Phi_{0.025}(VO_4)_2$ | 96.0000 | 2.3658 | 1.2789 | 1.03 |
| 3 | $Ca_{2.88}Nd_{0.08}\Phi_{0.04}(VO_4)_2$ | 100.0000 | 4.0050 | 2.1650 | 1.08 |
| 4 | $Ca_{2.85}Nd_{0.10}\Phi_{0.05}(VO_4)_2$ | 100.0000 | 5.0584 | 2.7346 | 1.01 |

The K-values represent a segregation or distribution coefficient for $Nd_2O_3$ in $Ca_3(VO_4)_2$. This number represents the concentration of $Nd_2O_3$ in the calcium vanadate host as $C_s/C_l$ where $s$=solid and $l$=liquid. The nearer the value of K approaches 1, the smaller will be the concentration gradient from the top to the bottom of the crystal. $Ca_3(VO_4)_2$ is unique in respect to permitting the value of K to approach 1, since for all other known single crystal hosts, K is either larger or smaller than 1.

*Example 5*

This example described the preparation of a single crystal of the composition of Example 3,

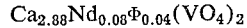

$Ca_{2.88}Nd_{0.08}\Phi_{0.04}(VO_4)_2$

Into an iridium crucible was charged 100.000 grams of calcium vanadate, $Ca_3(VO_4)_2$. This material was heated in air to slightly above its melting point, about 1470° C., and there was added to the melt stoichiometric quantities of neodymium oxide (4.005 grams) and vanadium pentoxide (2.165 grams) for the formation of the crystal of formula given above. A platinum wire was immersed in the top of the melt to a depth of about ¼". On this "cool finger" single crystals of the composition $Ca_{2.88}Nd_{0.08}\Phi_{0.04}(VO_4)_2$ up to ⅔" in length were formed. These seed crystals were then used to initiate single crystal growth for crystals up to ½" in diameter and up to 6" in length by means of the Czochralski technique.

Single crystal boules were cut and ground into cylindrical rods ¼ inch in diameter and 2 inches long. The cylindrical surfaces were left rough and the ends were polished. Silver was evaporated onto the end surfaces; one end was 5% transmissive and the other completely opaque. Laser characteristics were measured under pulsed illumination in a Lear-Siegler LS-3 laser head with Kemlite FT100B helical xenon flash lamp. An operating temperature of 135° K. was obtained by placing the laser crystals in precooled flowing nitrogen gas. The stimulated emission was detected with a Dumont K1485 photomultiplier through a 3 mm. silicon filter. At a threshold value of 3,000 joules, coherent emission was observed at 1.063μ at 135° K.

Although in all of the examples given above, neodymium was used as the rare earth element, any other rare earth element of atomic numbers 58 through 71 may be used in a similar manner. The compositions in which the rare earth elements praeseodymium, holmium, erbium, thulium, and ytterbium were used have been found to emit strongly at other wave lengths in the infrared over a very narrow band of wave lengths. These compositions are therefore useful as laser crystals in the infrared. In compositions where the rare earth element chosen was samarium, europium, terbium, or dysprosium, the crystals emitted with their characteristic wave lengths in the visible spectrum. These crystals are therefore useful as phosphors, in television and fluorescent tubes as well as for lasers with output in the visible region of the spectrum.

I claim:

1. A crystalline, single-phase, solid solution, luminescent composition consisting essentially of a calcium neodymium vanadate having vacancies in its crystal lattice, the component elements in the composition and their proportions relative to said vacancies being in accordance with the expression $Ca_{3-3x}Nd_{2x}\Phi_x(VO_4)_2$, where $\Phi$ is a vacancy, and $x$ has a value between 0.01 and 0.3.

2. A composition of claim 1 where $x$ has a value of 0.04.

3. A solid state laser having as an essential crystal component thereof a single crystal of the single phase solid solution composition of claim 2.

4. In a process for the preparation of a composition of claim 1 the steps comprising (1) thoroughly mixing stoichiometric quantities of (a) $Ca_3(VO_4)_2$, (b) $Nd_2O_3$, and (c) $V_2O_5$ according to the equation $$1-xCa_3(VO_4)_2 + xNd_2O_3 + xV_2O_5 \rightarrow Ca_{3-3x}Nd_{2x}\Phi_x(VO_4)_2$$

where $x$ has a value between 0.01 and 0.3, (2) firing the mixture between 600° C. and 800° C., (3) regrinding, and (4) refiring between 1000° C. and 1300° C.

5. In a process for the preparation of a composition of claim 1 in single crystal form, the steps comprising (1) preparing a melt of calcium vanadate, $Ca_3(VO_4)_2$; (2) adding to said melt stoichiometric quantities of $Nd_2O_3$ and vanadium pentoxide, $V_2O_5$, for the preparation of said composition; (3) immersing in said oxide-containing melt a single crystal seed of the selected composition, and (4) growing said single crystal at the rate of ¼ to 1 inch per hour by withdrawing it upward from the melt.

6. A process of claim 5 wherein $x$ has a value of 0.04.

References Cited

UNITED STATES PATENTS

| 3,152,085 | 10/1964 | Ballman et al. | 252—301.4 |
| 3,243,723 | 3/1966 | Van Uitert | 252—301.4 |
| 3,250,722 | 5/1966 | Borchardt | 252—301.4 |
| 3,257,327 | 6/1966 | Nassau | 252—301.5 |

OTHER REFERENCES

Kroger: Some Aspects of the Luminescence of Solids, 1948, pages 109, 110 and 285.

TOBIAS E. LEVOW, *Primary Examiner.*

HELEN M. McCARTHY, *Examiner.*

R. D. EDMONDS, *Assistant Examiner.*